P. W. Strong.

Making Cheese.

Nº 97,131.  Patented Nov. 23, 1869.

Witnesses:

Inventor.
P. W. Strong

United States Patent Office.

P. W. STRONG, OF EVANS' MILLS, NEW YORK.

Letters Patent No. 97,131, dated November 23, 1869.

---

IMPROVEMENT IN APPARATUS FOR MANUFACTURING CHEESE.

---

The Schedule referred to in these Letters Patent and making part of the same.

---

*To all whom it may concern:*

Be it known that I, P. W. STRONG, of Evans' Mills, in the county of Jefferson, and State of New York, have invented a new Improved Apparatus to be Used in the Manufacture of Cheese; and I do hereby declare that the following is a full, clear, and exact description thereof, reference being had to the accompanying drawings, making part of this specification, in which—

Figure 1:
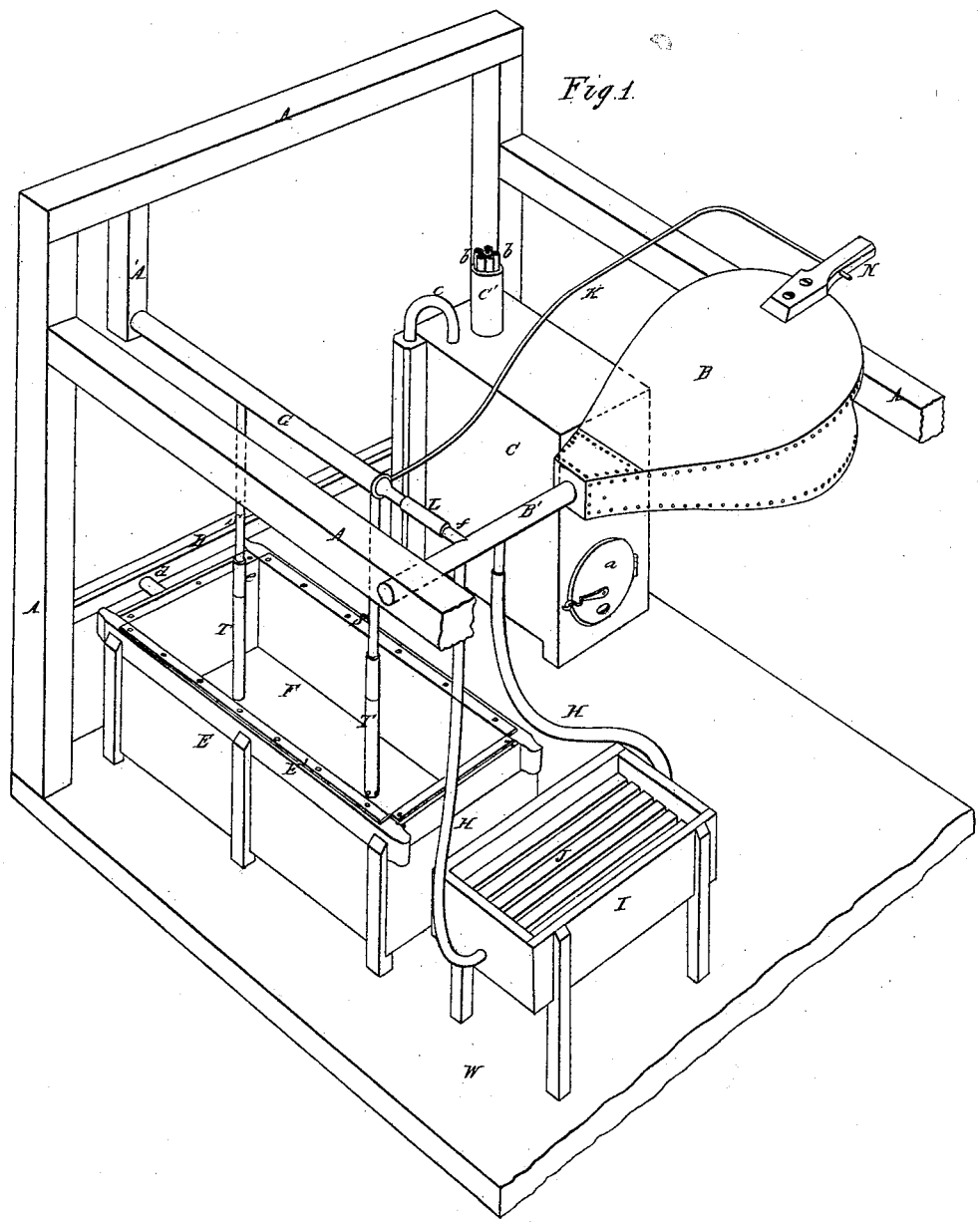

Figure 1 is a perspective view, representing the several parts of the apparatus used in the improved manufacture of cheese.

Figure 2:
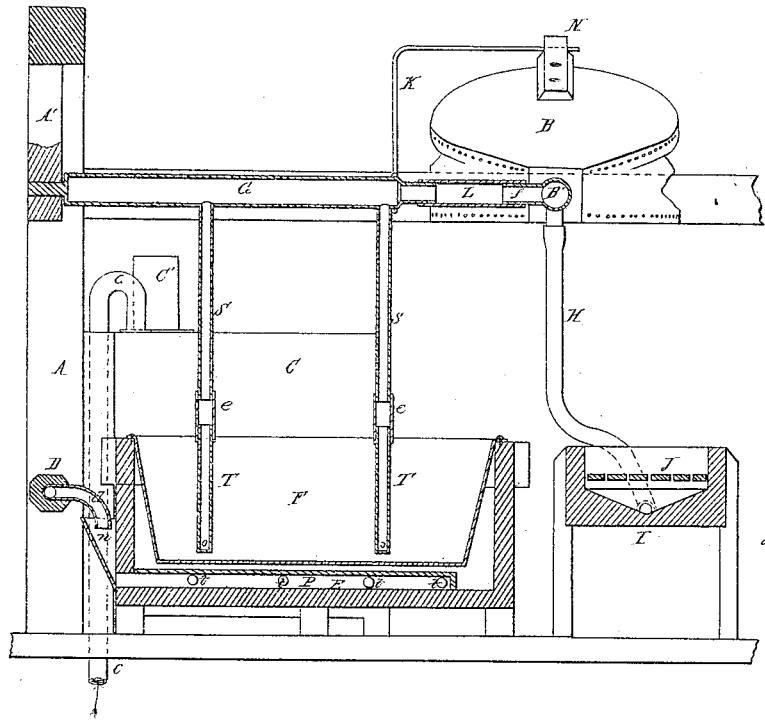
Figure 3:
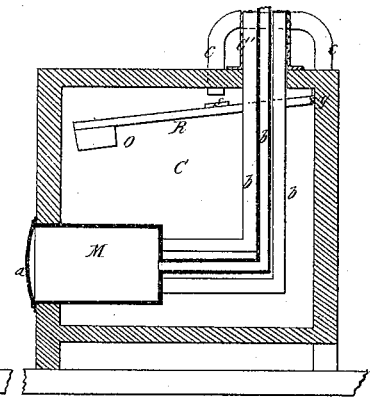

Figure 2, plate 2, is a vertical section, through the cheese-vat, curd sink, and the pipes which conduct air into the body of the milk in the vat for cooling the milk.

Figures 3, 4, 5, and 6, plate 2, showing mode of constructing that part of the apparatus which is used for heating water.

Figure 7:
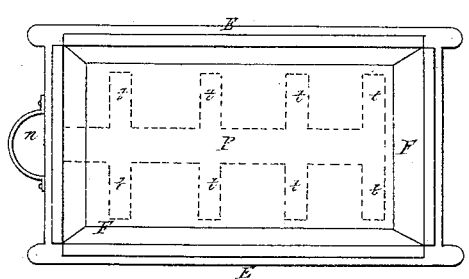
Figure 4:
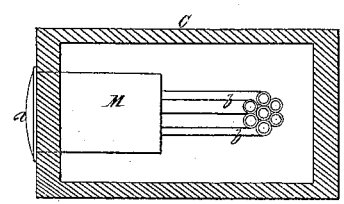

Figure 7, plate 2, is a top view of the cheese-vat.

Similar letters of reference indicate corresponding parts in the several figures.

This invention relates to certain novel improvements which will facilitate the process of cheese-making.

Preparatory to commencing the process of curdling milk, it is necessary to deprive it of its animal heat and odors, and keep it in motion to prevent the cream from rising.

To effect these objects, the nature of my invention consists—

First, in combining with one or more curdling-vats a cool-water-supplying apparatus, and an air-supplying apparatus, constructed and applied as will be hereinafter explained.

During the process of curdling the milk, it is necessary to apply heat to it, and for this purpose the nature of my invention consists, secondly, in a water-heating apparatus, which will supply warm water beneath the curdling-vat or vats, and which is supplied automatically with cool water as rapidly as the heated water is conveyed off to the vat or vats.

After curdling it is desired to quickly dry and purify the curd, and to this end the nature of my invention consists, thirdly, in providing for the introduction of pure cool air beneath the rack in the curd-sink, by means of the same air-supplying apparatus which is used for forcing air into the curdling-vat, as will be hereinafter explained.

To enable others skilled in the art to understand my invention, I will describe its construction and operation.

For the purpose of facilitating the description of my apparatus, I have represented, in fig. 1, the several parts composing it as they would appear if arranged within one room or apartment; but in practice I shall locate the water-supplying apparatus in an apartment separate from the manufacturing-room, for the purpose of avoiding in this room the heat, dirt, and steam which rise from the said apparatus when it is necessary to heat the water therein.

If desirable, the bellows or air-supplying apparatus may also be located in an apartment separate from the manufacturing-room, for the purpose of having the air which is forced through this apparatus pure and cool.

The water-supplying apparatus consists of a chamber of any suitable capacity, surrounded by walls C, and adapted for containing water.

Within this chamber, and located near the bottom thereof, is a fire-box, M, horizontally arranged, and provided with a feed-door, $a$, for supplying fuel.

From the back or rear end of this fire-box M, small flue-pipes $b\ b$ extend, which are carried upward and out through the top wall into a main flue or chimney, $C^1$, for the purpose of conducting off the spent products of combustion.

The pipes or flues $b$ afford a very large amount of heating-surface, and communicate considerable heat to the water surrounding them in the chamber surrounded by walls C.

For the purpose of keeping chamber C properly supplied at all times with water, a pipe, $c$, leads from a reservoir, spring, or other fountain-head, which is located above the level of said chamber, at its upper end, and is provided with a floating cut-off, consisting of a vertically-vibrating arm, R, having a float, O, on its free end, and a plug or valve, $s$, so arranged with reference to the discharge-end of said pipe $c$ that the water will be maintained at a uniform height in the chamber C.

Figures 5, 6:
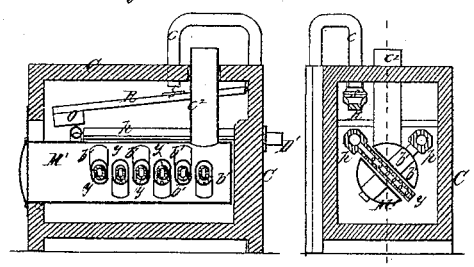

Another form of heating-apparatus may be applied within the chamber C, instead of the one above described. This is shown in figs. 5 and 6, and consists of a fire-chamber, M', made of cylindrical or other form, and arranged horizontally in said chamber C; with a chimney or flue-pipe, $C^2$, leading up through the top wall of said chamber, for conducting off the products of combustion.

In this heater the flame is brought in direct contact with diametrically-arranged pipes $b'\ b'$, which prevent much of the central heat from escaping up chimney $C^2$; and each one of these pipes $b'$ is provided with a short wooden pipe, $y$, which is perforated with small holes, and which is connected to a longitudinal wooden pipe, $p$, that communicates with a distributing-pipe, D', which conveys water to pipes leading to the curdling-vat or vats.

The short perforated pipes $y$ do not fit tightly in the cross-pipes $b'$, but spaces are allowed around them for currents of water to circulate freely and enter these pipes $y$, through their perforations.

By this arrangement of pipes, a constant stream of water can be drawn from the chamber C through the distributing-pipes; and when heat is applied in the fire-box M', the water will be warmed by contact with the sides of this box, and an extra amount of heat will be communicated to the water while drawing it off, by causing the currents to enter the cross-pipes b' before escaping into the pipes y.

The pipes y p may be made of wood or metal, but I prefer the wood, as it is a good non-conductor of heat, and will not corrode.

While I prefer to employ the heating-apparatus last described, on account of economy of fuel and equality of heat communicated to the water, I do not confine myself to this precise construction of heating-apparatus.

The distributing-pipe D' communicates with a pipe, D, which may be made of wood, or made of metal and enclosed by a poor conductor of heat, and which leads off to a funnel, n, applied to a tank, E, containing the curdling-vat F.

Water is discharged into the funnel n, from pipe D, by means of a short nozzle, d, shown in fig. 2, and this funnel leads down into a pipe, P, from which short branch-pipes t extend, as indicated in dotted lines, fig. 7.

The pipe P and its branches t are thickly perforated, and are arranged within a space enclosed by the walls of the curdling-vat F and its tank E, and located beneath said vat, so as to afford a bottom support for it.

The vat F is secured, by its upper flanged edges, to a removable frame, E', which fits snugly on top of the tank E, and is held in place by the upper extensions of the standards which support this tank, as shown in fig 1.

If several curdling-vats are used, they will be provided with tanks supplied with water from the chamber C, as above described for the single tank.

Before proceeding further with my description, I will state that for the purpose of supplying water to cool the milk in vat or vats F, preparatory to the curdling-process there is no fire made in the fire-box; consequently cold water will flow through the distributing-pipes and beneath the curdling-vat or vats. The water is only heated during the process of curdling.

In combination with the tank F, and also with a curd-sink, I, I also employ an air-supplying apparatus. This may consist of bellows B, or other suitable air-forcing pump, which is supported by a frame, A, at a suitable height to be out of the way, and from its nozzle B' air is conducted into an oscillating pipe, G, or into branch-pipes or hose H, or into both.

The pipe G is arranged in a horizontal plane over the centre of the vat F, and supported, at its closed end, by a pendant, A', and at the opposite end by a pipe, f, and flexible tube L.

The flexible tube L is used to allow pipe G to be oscillated by a rod, K, proceeding from the arm N of the bellows, but instead of this tube L any other tight-joint connection may be adopted which will operate in a similar manner.

The rod K being fastened at one end to the bellows-arm N, and at the other end to the pipe G, it will be seen that this pipe will receive an oscillating motion at the same time the upper leaf of the bellows is operated to force air into this pipe.

If it is desired to have the pipe G remain stationary while the bellows are being operated, the rod K may be detached from arm N.

From the pipe G, air is forced into the body of milk in vat F, through pendent pipes, which will also serve the purpose of agitators during the process of cooling the milk.

Each one of the pendent pipes consists of a section, S, made fast to pipe G, a pipe, T, which reaches into the milk in vat F, and a flexible coupling, e, which unites the sections S T, and allows the lower section T to be removed at pleasure.

The lower sections T may be made of wood, metal, or glass, with their lower ends perforated, to allow the air to escape into the body of milk in vat F.

The air-pipes H, which lead into the curd-sink I, may be provided with cocks for shutting off the flow of air through them when it is desired to force all the air into the vat F; and the pipe f may also be provided with a cock for shutting off the flow of air to the vat F, when it is desired to force all the air into the curd-sink.

The curd-sink consists of a box, I, mounted upon legs, and provided with a removable rack, J, upon which latter the curd is worked in the usual well-known manner.

The pipes H H lead into the ends of the sink I, beneath the rack J, and allow the bellows B to force air in such quantities upward through the rack J as to cool and purify the curd while it is draining and being worked.

The bellows will also serve as a means for cooling and purifying the air of the manufacturing apartment during hot and sultry weather, by furnishing pure, cool air in abundance to this apartment.

It will be seen from the above description that during the process of cooling the milk, and depriving it of its animal odors, I am enabled to use in large quantities cool water, regulated in its flow and distributed uniformly over the bottom of the vat F, and that during this cooling-process I introduce pure cool air into the body of milk in said vat, and at the same time agitate the milk to prevent the cream from rising or separating.

During the process of curdling the milk, I employ the same apparatus which I used for conducting cold water to the vat F, as above stated, for warming and conducting warm water to this vat.

I also employ the air-forcing bellows for the purpose of forcing air under the rack of the curd-sink, and thus cooling and purifying the particles of curd while being worked and drained of whey.

Having described my invention,

What I claim as new, and desire to secure by Letters Patent, is—

1. The combination of the automatic device R, or its equivalent, the water-supplying pipe c, vat-tank E, and funnel n, substantially as described.

2. The arrangement of the water-chamber C, constructed to operate as described, heater M, vat F, and tank E, all constructed and combined substantially as described.

3. The arrangement of the perforated pipes P and t, vat F, tank E, funnel n, and water-supply chamber C, constructed as described, in the manner and for the purpose described.

4. The combination of an air-supplying apparatus with a vat, F, and tank E, substantially as described.

5. The combination of air-supplying agitators with vat F and tank E.

6. One or more pipes leading from an air-supplying apparatus beneath the rack in a curd-sink, I, substantially as described.

P. W. STRONG.

Witnesses:
JOHN J. KINNEY,
S. P. KINNEY.